(12) United States Patent
Umemoto et al.

(10) Patent No.: US 8,297,522 B2
(45) Date of Patent: Oct. 30, 2012

(54) MULTILAYER REFLECTOR, AUTHENTICATION CARD, BAR CODE LABEL, AUTHENTICATION SYSTEM, AND AUTHENTICATION REGION FORMING SYSTEM

(75) Inventors: Seiji Umemoto, Ibaraki (JP); Kazuhito Kouno, Ibaraki (JP); Kazumasa Shibata, Tokyo (JP); Itsuo Takeuchi, Yokohama (JP); Tokio Sakauchi, Yokohama (JP); Tohru Ida, Yokohama (JP)

(73) Assignees: Nitto Denko Corporation, Ibaraki-shi, Osaka (JP); NHK Spring Co., Ltd., Yokohama-shi, Kanagawa (JP)

( * ) Notice: Subject to any disclaimer, the term of this patent is extended or adjusted under 35 U.S.C. 154(b) by 658 days.

(21) Appl. No.: 11/993,673

(22) PCT Filed: Jun. 21, 2006

(86) PCT No.: PCT/JP2006/312418
§ 371 (c)(1),
(2), (4) Date: Jan. 28, 2010

(87) PCT Pub. No.: WO2006/137442
PCT Pub. Date: Dec. 28, 2006

(65) Prior Publication Data
US 2010/0123943 A1    May 20, 2010

(30) Foreign Application Priority Data

Jun. 23, 2005 (JP) .................................. 2005-183587

(51) Int. Cl.
*G06K 19/06* (2006.01)
(52) U.S. Cl. .................. 235/494; 235/487; 235/488
(58) Field of Classification Search ........... 235/487–495
See application file for complete search history.

(56) References Cited

U.S. PATENT DOCUMENTS 4,659,112 A    4/1987    Reiner et al.
(Continued)

FOREIGN PATENT DOCUMENTS

JP    6-40189 A    2/1994
(Continued)

OTHER PUBLICATIONS

European Search report dated Dec. 21, 2009, issued in corresponding European Patent Application No. 06767077.8.
(Continued)

*Primary Examiner* — Thien M Le
*Assistant Examiner* — Christle Marshall
(74) *Attorney, Agent, or Firm* — Westerman, Hattori, Daniels & Adrian, LLP

(57) ABSTRACT

Provided is a multilayer reflector about which a complicated step is not required when the molecular alignment of a retardation film is partially relaxed to form a latent image of authentication information, and about which the latent image is not made visible by the generation of unevenness in the surface. A multilayer reflector 1 has a retardation film 10 in which the phase difference $\Delta nd_1$ to an observation wavelength $\lambda$ is set to be $m \times \lambda/4 - \lambda/16 \leq \Delta nd_1 \leq m \times \lambda/4 + \lambda/16$ wherein m is a positive odd number, and a metallic reflector 11 laminated on the rear face side of this retardation film 10, wherein an authentication region 10a where predetermined authentication information is beforehand formed in the retardation film 10 is formed to give a phase difference $\Delta nd_2$ set to be $n \times \lambda/4 - \lambda/8 \leq \Delta nd_2 \leq n \times \lambda/4 + \lambda/8$ wherein n is 0 or a positive even number provided that n<m, and further a light diffusing layer 12 is formed on the front face side of the retardation film 10.

20 Claims, 5 Drawing Sheets

U.S. PATENT DOCUMENTS

| | | | |
|---|---|---|---|
| 5,284,364 A * | 2/1994 | Jain | 283/87 |
| 5,393,099 A | 2/1995 | D'Amato | |
| 5,574,790 A | 11/1996 | Liang et al. | |
| 5,856,048 A | 1/1999 | Tahara et al. | |
| 6,124,970 A | 9/2000 | Karassev et al. | |
| 6,667,797 B2 * | 12/2003 | Wang et al. | 356/71 |
| 6,734,936 B1 | 5/2004 | Schadt et al. | |
| 2002/0022093 A1 | 2/2002 | Kuntz et al. | |
| 2003/0124436 A1 | 7/2003 | Shioda et al. | |
| 2006/0108063 A1 * | 5/2006 | Umemoto et al. | 156/272.2 |

FOREIGN PATENT DOCUMENTS

| | | |
|---|---|---|
| JP | 6-247084 A | 9/1994 |
| JP | 8-334618 A | 12/1996 |
| JP | 09-068927 A | 3/1997 |
| JP | 10-143057 A | 5/1998 |
| JP | 2000-273129 A | 10/2000 |
| JP | 2001-071698 A | 3/2001 |
| JP | 2001-071699 A | 3/2001 |
| JP | 2001-232978 A | 8/2001 |
| JP | 2001-521179 A | 11/2001 |
| JP | 2001-525080 A | 12/2001 |
| JP | 2002-32023 A | 1/2002 |
| JP | 2002-274000 A | 9/2002 |
| JP | 2005-032124 A | 2/2005 |

OTHER PUBLICATIONS

Notification of Transmittal of Translation of the International Preliminary Report on Patentability of International Application No. PCT/W2006/312418 mailed Jan. 10, 2008 with Forms PCT/IB/338; PCT/IB/373; PCT/ISA/237.

International Search Report of PCT/JP2006/312418, date of mailing Oct. 3, 2006.

Japanese Office Action dated Jan. 6, 2011, issued in corresponding Japanese patent Application No. 2005-183587.

European Office Action dated Jul. 18, 2012, issued in corresponding European Patent Applicaton No. 06 767 077.8, (6 pages).

* cited by examiner

MULTILAYER REFLECTOR, AUTHENTICATION CARD, BAR CODE LABEL, AUTHENTICATION SYSTEM, AND AUTHENTICATION REGION FORMING SYSTEM

TECHNICAL FIELD

The present invention relates to a multilayer reflector having authentication information having a secret property and a recognition property by which it is easily decided whether or not the information is authentic against a third person who makes an act such as forgery or rewriting with ill will or a third person who sells a forged product; an authentication card using this multilayer reflector; a bar code label; an authentication system; and an authentication region forming system.

BACKGROUND ART

In credit cards or ID cards, authentication information is recorded. A decision as to whether the information is authentic or not has been made by use of a magnetic recording region arranged in the rear face of the cards, a hologram attached to the front face thereof, or some other member. For example, authentication by use of a hologram image is disclosed in U.S. patents listed as Patent Documents 1 and 2 below.

In a passport disclosed in Patent Document 3 listed below, a latent image which cannot be recognized with naked eyes without using any polarizing plate is formed in a layer made of a polymeric liquid crystal material, and a reflecting layer is formed beneath the layer. The document discloses a method of radiating polarized light thereto and observing the reflected light through the polarizing plate, thereby authenticating a pattern formed as the latent image.

A means for forming a latent image in a retardation film may be a method of giving a part of the retardation film a heat for the glass transition point or higher, thereby lowering the phase difference (the degree of the alignment of the molecules) of the part, or a method of applying a chemical liquid wherein the retardation film can be dissolved or swelled, thereby lowering the phase difference of the region, as disclosed in Patent Document 4 listed below.

An optical element disclosed in Patent Document 5 listed below is in accordance with a method of changing the azimuthal angle of the optical axis of its retardation layer to form a latent image, and observing the image through a polarizing plate, thereby attaining an authentication.

Patent Document 1: U.S. Pat. No. 5,574,790
Patent Document 2: U.S. Pat. No. 5,393,099
Patent Document 3: Japanese Patent Application Laid-Open (JP-A) No. 2001-232978
Patent Document 4: JP-A No. 8-334618
Patent Document 5: Japanese Patent Application National Publication (JP-A-) No. 2001-525080

DISCLOSURE OF THE INVENTION

Problems to be Solved by the Invention

In the case of the authentication of credit cards or the like that Patent Documents 1 and 2 disclose, the forgery of their hologram regions has been becoming a problem. In the case of hologram patterns, the patters are each produced by forming a thin film of a metal having a high reflectance, such as aluminum, onto unevenness in the order of micrometers. The hologram patterns can be seen with naked eyes, and may be imitated if a cutting device is prepared.

In the case of Patent Document 3, it is disclosed that a latent image is formed by use of a step of heating a thermotropic polymeric liquid crystal layer, or some other step. In this manner, a means for aligning the polymeric liquid crystal depends on an external force such as pressure; thus, in order to obtain a sufficient alignment, it is necessary to use the application of a high pressure or a sufficient "shearing stress". Accordingly, in order to obtain a latent image having a phase difference modulated in accordance with a heating pattern, it is necessary for the alignment of the liquid crystal that the liquid crystal is caused to have birefringence in the plane thereof. For this purpose, it is necessary to apply a sufficient "shearing stress" to the liquid crystal in a liquid crystal state in such a manner that its slow axis is along a specific direction in the plane. For this reason, pressure is applied to the substrate or the liquid crystal layer itself under heating, so as to result in a problem that the substrate is deformed or the liquid crystal layer is damaged, and other problems. Thus, there arises, for example, a problem that a pushed stamp or mark causes the generation of an uneven pattern and even if a polarizing plate is not used, the latent image is made visible and can be unfavorably seen.

Furthermore, a latent image can be formed by the method disclosed in Patent Document 4 also. However, when an attempt is made for canceling the phase difference of a retardation film, it is necessary to raise the temperature of the retardation film to the glass transition point or higher and further keep the temperature as it is for a predetermined time. The heating of the retardation film to the glass transition point or higher causes a problem that the molecular alignment of the retardation film is relaxed, thereby generating unevenness in the surface shape so that the latent image is made visible and can be unfavorably seen, as described above. This is true also in the case that heating in a non-contact state is performed. Even under the application of no pressure, the film is permanently deformed by alignment relaxation.

Also, in the case of applying a chemical liquid, relaxation of the molecular alignment of the retardation film is caused in the same manner. For this reason, it is necessary to give a high freedom degree to the polymer which forms the retardation film. As a result, deformation of the surface shape, which follows the relaxation, is generated. In the case of applying a chemical liquid, this can be controlled by the bleeding-in of the chemical liquid itself. However, the liquid bleeds in from the surface; therefore, the phase difference cannot be made sufficiently small when it is caused to such a degree that no shape relaxation is generated. In other words, a problem that the contrast of the latent image cannot be made large is caused. Furthermore, in the case of the chemical liquid swelling, the liquid widens in the width direction of the retardation film at the same time when the liquid bleeds into the thickness direction of the film. Accordingly, there is caused a problem that the resolution of the latent image formed in the region where the phase difference is changed and the region where it is not changed cannot be obtained.

In the case of the method disclosed in Patent Document 5, necessary is the step of forming an optically aligning film, radiating polarized ultraviolet rays directed to a predetermined direction thereto while the rays are transmitted through a mask or the rays are scanned, radiating polarized ultraviolet rays directed to another direction thereto so as to form a polymerizable liquid crystal or a liquid crystal polymeric thin film, and then aligning/fixing this. Thus, the method has such a very complicated step. At this time, the optically aligning film for deciding the alignment direction of the liquid crystal is expensive, and further the polymerizable liquid crystal and the liquid crystal polymer are also relatively expensive.

Moreover, it is necessary to prepare two uniform and intense light sources of the polarized ultraviolet rays, which are polarized into the different directions; however, the efficiency thereof is low and the device itself is also expensive. The liquid crystal layer is generally formed through a coating step. However, the degree of the birefringence of the liquid crystal itself is large; thus, it is difficult to control the thickness of the thin film when a predetermined phase difference is desired to be obtained.

In light of the above-mentioned actual situation, the present invention has been made. An object thereof is to provide a multilayer reflector about which a complicated step is not required when the molecular alignment of a retardation film is partially relaxed to form a latent image as authentication information, and the latent image is not made visible by the generation of unevenness on its surface; an authentication card using this multilayer reflector; a bar code label; an authentication system; and an authentication region forming system.

Means for Solving the Problems

In order to solve the above-mentioned problems, the multilayer reflector according to the present invention comprises a retardation film in which the phase difference $\Delta nd_1$ to an observation wavelength $\lambda$ is set to be $m \times \lambda/4$ wherein m is a positive odd number, and a reflecting means laminated on the rear face side of this retardation film, wherein an authentication region where predetermined authentication information is beforehand formed in the retardation film is formed to give a phase difference $\Delta nd_2$ different from the phase difference $\Delta nd_1$, and further a light diffusing layer is formed on the front face side of the retardation film.

The effect and advantages of the multilayer reflector based on this structure are described. The multilayer reflector has a retardation film, a reflecting means laminated on the rear face side of this retardation film, and a light diffusing layer formed on the front face side of the retardation film. In the retardation film, an authentication region based on predetermined authentication information is beforehand formed. The retardation film is designed to set the phase difference $\Delta nd_1$ to an observation wavelength $\lambda$ to $m \times \lambda/4$ wherein m is a positive odd number. Thus, when linearly polarized light (observing light) having, for example, a polarization direction of 45° to the slow axis of this retardation film is radiated thereinto through a polarizing plate, the linearly polarized light is converted to circularly polarized light since the film has the above-mentioned phase difference. This circularly polarized light is converted to circularly polarized light having a reverse polarity and reflected by means of the reflecting means formed on the rear face side of the retardation film. This reflected light is again transmitted through the retardation film, thereby generating linearly polarized light of an angle substantially perpendicular to the original linearly polarized light. Accordingly, the reflected light cannot be transmitted through the polarizing plate, so as to give a black display. In short, a black display is observed about the non-authentication region of the retardation film.

On the other hand, the authentication region, where the authentication information is formed, is formed to give a phase difference $\Delta nd_2$ different from the phase difference $\Delta nd_1$ of the non-authentication region. In the formation of the authentication region, for example, the portion thereof is heated to the glass transition point or higher, thereby generating alignment relaxation so that the phase difference changes to the phase difference $\Delta nd_2$, which is smaller than the original phase difference $\Delta nd_1$. Accordingly, when the same linearly polarized light as described above is radiated thereinto, the light becomes elliptically polarized light having a smaller ellipticity than that of the circularly polarized light obtained in the non-authentication region. For this reason, the polarized light when reflected on the reflecting means is reversed to a smaller degree. Accordingly, the polarized light transmitted again through the retardation film does not turn into a form perpendicular to the original linearly polarized light, so that the reflected light from the authentication region becomes higher in transmittance than the reflected light from the non-authentication region. Consequently, the authentication information formed in the authentication region can be recognized with the naked eye. The authentication information can be recognized by use of the polarizing plate, but cannot be recognized through ordinary light (in the state that no polarizing plate is used).

The light diffusing layer is formed on the front face side of the retardation film. For example, when the non-authentication region is heated and pressed with a stamp, unevenness is generated, in particular, in the boundary region between the non-authentication region and the authentication region and this may be unfavorably seen under ordinary light. Thus, the light diffusing layer is formed, whereby such unevenness can be made substantially invisible. As a result, it is possible to provide a multilayer reflector about which when the molecular alignment of its retardation film is partially relaxed to generate a latent image of the authentication information, the latent image is not made visible by the generation of unevenness in the surface.

It is preferred that the phase difference $\Delta nd_1$ of the retardation film related to the invention is produced with an error range of $\pm \lambda/16$.

If the error range is over $\pm \lambda/16$, the amount of the reflected light transmitted through the polarizing plate in the non-authentication region becomes large in the above-mentioned observing method so that the contrast between the region and the authentication region becomes small. When the error range is controlled into $\pm \lambda/16$, a predetermined contrast can be obtained. Thus, the authentication information is easily recognized (or read out) when observed.

The phase difference $\Delta nd_2$ of the authentication region related to the invention is preferably set to be $n \times \lambda/4$ wherein n is 0 or a positive even number provided that n<m.

When the phase difference is set to this phase difference $\Delta nd_2$ and the same linearly polarized light as described above is radiated into the retardation film, the polarized light transmitted through the retardation film is also linearly polarized light; therefore, polarization conversion is not generated in the reflection on the reflecting means. Accordingly, the reflected light which is obtained by reflection on the reflecting means and is again transmitted through the retardation film becomes linearly polarized light having the same polarization direction as when the original light is radiated thereinto. For this reason, almost all of the light is transmitted through the polarizing plate. In other words, the reflected light is hardly transmitted into the non-authentication region while almost all of the reflected light is transmitted into the authentication region. Thus, a maximum contrast can be obtained, so that the authentication information can easily be recognized.

It is preferred that the phase difference $\Delta nd_2$ of the authentication region related to the invention is produced with an error range of $\pm \lambda/8$.

If the error range is over $\pm \lambda/8$, the amount of the reflected light transmitted through the polarizing plate is reduced in the above-mentioned observing method so that the contrast between the region and the non-authentication region becomes small. When the error range is controlled into $\pm \lambda/8$, a predetermined contrast can be obtained. Thus, the authentication information is easily recognized when observed.

The phase difference $\Delta nd_2$ of the authentication region is in particular preferably $\lambda/8$ or less. In the above-mentioned expression, it is preferred that m and n are set to 1 and 0, respectively, and the error range of the phase difference $\Delta nd_2$ is set to $\lambda/8$ or less from the viewpoint of easiness of the control of the value of the phase difference. This makes it possible to form an authentication region having a desired phase difference with ease, and keep a contrast certainly.

It is preferred that the authentication region related to the invention is formed by pressing a stamp having a heating pattern corresponding to the authentication information onto the retardation film, or by arranging the stamp closely to the retardation film, thereby relaxing the alignment of the retardation film thermally.

The authentication region having the authentication information can be formed by giving a heating pattern. For example, a stamp having a high temperature region patterned in advance is pressed onto the retardation film, or the stamp is arranged closely to the retardation film, thereby relaxing the alignment thereof thermally. The formed pattern represents predetermined authentication information. It is sufficient to prepare the stamp in advance. As it is compared with, for example, the structure in Patent Document 5, the authentication region can be formed through a simpler step.

It is preferred that the authentication region related to the invention is formed by radiating a light ray patterned correspondingly to the authentication information to the retardation film, or scanning a light ray onto the retardation film, thereby forming a predetermined pattern to relax the alignment of the retardation film thermally.

A different method for giving the heating pattern may be a method of radiating a patterned light ray onto the retardation film or scanning a light ray onto the retardation film, thereby radiating the light thereon while forming the heating pattern. As described herein, according to thermal energy which the light ray has, the alignment of the retardation film can be thermally relaxed. The light ray radiated onto the retardation film needs to be absorbed into at least the retardation film or the reflecting means and be changed into heat. It is more preferred to use a light ray having a wavelength that this film or means can absorb. For example, an infrared laser, a carbon dioxide gas laser, a YAG laser or the like can be used.

It is preferred that the heating temperature for the authentication region related to the invention is a temperature not lower than the glass transition point (Tg) of the retardation film. From the viewpoint of thermal relaxation of the alignment, the heating temperature is usually Tg+20° C. or higher, preferably Tg+30° C. or higher, and more preferably Tg+50° C. or higher. In this thermal relaxation step, the molecules constituting the retardation film turn into a more movable state by the heating. Thus, the alignment state thereof is changed so that the molecules turn into a more random state. In particular, when the heating is heating up to a considerably higher temperature than Tg, the retardation film turns into a very soft state in this thermal relaxation step. In company with the change of the alignment state, the surface state is also changed so that unevenness is formed. In this way, the authentication information can be formed.

An example of the authentication information related to the invention is information made of a one-dimensional or two-dimensional bar code. Any ordinary bar code label is produced through a printing process. However, the label can be recognized with the naked eye under ordinary light. In the state that the label can be recognized with the naked eye, the position of the bar code cryptogram is easily specified and the information is easily read out, so that the code will easily be copied. When such bar code information is constructed by use of the multilayer reflector of the invention, it is possible to make the copying of the information difficult.

In the invention, it is preferred that the size of a light diffusing element of the light diffusing layer is smaller than the size of a pattern formed in the authentication region. In particular, in the boundary region between the non-authentication region and the authentication region, unevenness may be formed. The authentication information may be seen under ordinary light; thus, the light diffusing layer is formed. However, if the light diffusing element in the light diffusing layer is larger than the pattern, an effect of making the irregularity shape substantially invisible (masking effect) cannot be obtained. Thus, the size of the light diffusing element is preferably made smaller than the size of the pattern.

It is preferred that the light diffusing element related to the invention is an uneven shape of the surface of the light diffusing layer, and/or an object in the form of grains dispersed in the light diffusing layer, and the size thereof is smaller than the size of the pattern by ¼ or less.

As the size of the light diffusing element is smaller than the size of the pattern, larger advantageous effects are obtained. When the size is made smaller by ¼ or less, the masking effect can be further exhibited.

When the light diffusing layer related to the invention is formed to adhere closely onto the front face side of the retardation film, the masking effect can be even further exhibited.

It is preferred that the light diffusing layer related to the invention is made of a mixture of a transparent resin and transparent fine particles dispersed therein. This structure makes it possible to scatter light, and mask the irregularity shape.

The reflecting means related to the invention is preferably constituted by a phase hologram made of a diffraction grating. By use of this phase hologram, the forgery can be made more difficult.

The multilayer reflector according to the invention can be fitted to an authentication card. Examples of the authentication card include prepaid cards, credit cards, and ID cards. The multilayer reflector can be fitted to a bar code label having a pattern made of a one-dimensional or two-dimensional bar code. In order to verify whether or not these authentication cards are each authentic, an adhesive agent or sticking agent is used to cause the multilayer reflector according to the invention to adhere thereto and the resultant can be used.

Using the multilayer reflector according to the invention, an authentication system can be constructed, and the system comprises:

a light source for radiating light onto the multilayer reflector, a light receiving unit for reading out reflected light from the multilayer reflector, and a linearly polarizing plate arranged between the multilayer reflector and the light receiving unit, wherein the absorption axis of this linearly polarizing plate is set to give an angle different from that of the optical axis of the retardation film constituting the multilayer reflector.

By use of this authentication system, the authentication information formed as a latent image can be made visible. As the light source for readout, a source which emits light having an observation wavelength is used. If necessary, a polarizing plate is arranged between the light source and the multilayer reflector to convert the light to linearly polarized light. In the case of a light source giving a vibration of linearly polarized light, such as a laser light source, it is unnecessary to arrange the above-mentioned polarizing plate. Moreover, a linearly polarizing plate is arranged in an optical path between the multilayer reflector and the light receiving unit, and its absorption axis is made different from the optical axis of the retardation film. As described above, therefore, a contrast is generated between reflected light from the authentication region and reflected light from the non-authentication region, and the authentication information can be read out by means of the light receiving unit through the linearly polarizing plate. If no linearly polarizing plate is present, the authentication information is kept as the latent image and cannot be read out by means of the light receiving unit.

When the above-mentioned angle is set to about 45° in the invention, a large contrast can be obtained so that the authentication information can easily be read out.

In the invention, it is preferred that the system comprises a pinhole or slit arranged between the light receiving unit and the multilayer reflector, and a scanning means for scanning the authentication information formed in the multilayer reflector through this pinhole or slit, the system being made to receive optically the authentication information scanned by the light receiving unit.

The readout of the authentication information can be attained also by a matter that the light receiving unit receives, through the pinhole or slit, reflected light from the multilayer reflector. In this case, the authentication information can be scanned and read out by shifting the pinhole or slit relatively to the multilayer reflector. The authentication information can be scanned and read out, for example, by shifting the pinhole or slit relatively to the multilayer reflector, or by fixing the pinhole or slit and shifting the multilayer reflector.

The authentication region forming system used to form an authentication region in the multilayer reflector according to the invention has a heating means capable of attaining heating to a temperature not lower than the temperature at which the phase difference can be changed. Specific examples of the heating means include a stamp having a heating pattern, and a radiating means using a light ray, such as a laser.

Figure 1:
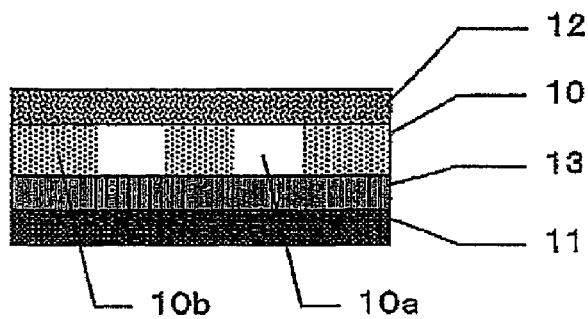
[FIG. 1] It is a view illustrating a sectional structure of a multilayer reflector.

EXPLANATION OF REFERENCE NUMBERS 1 multilayer reflector
2 polarizing plate
5 stamp
10 retardation film
10a authentication region
10b non-authentication region
11 metallic reflector
12 light diffusing layer
13 first sticking agent layer
14 second sticking agent layer
20 film roll
21 sticking agent roll
22 metal foil roll
23 sticking agent roll
30 light source
31 polarizing plate
32 half mirror
33 polarizing plate
34 light receiving unit
35 readout device
36 display section
37 reflecting layer
38 hologram forming layer
K1, K2, K3 and K4 steps
x slow axis
y fast axis Best Mode for Carrying Out the Invention <Structure of Multilayer Reflector>

A preferred embodiment of the multilayer reflector according to the invention is described, using the drawings. FIG. 1 is a schematic view illustrating a sectional structure of a multilayer reflector 1. In FIG. 1, a metallic reflector 11 (corresponding to the reflecting means) is laminated on the rear face side of a retardation film 10, and a cover coat layer 12 (corresponding to the light diffusing layer) is formed on the front face side of the retardation film 10. Moreover, a first sticking agent layer 13 for sticking the retardation film 10 and the metallic reflector 11 to each other is deposited, and further a second sticking agent layer 14 is deposited on the rear face side of the metallic reflector 11.

The retardation film 10 is formed in such a manner that the phase difference $\Delta nd_1$ thereof can satisfy the following expression (1):

$$m \times \lambda/4 - \lambda/16 \leq \Delta nd_1 \leq m \times \lambda/4 + \lambda/16 \qquad (1)$$

($\lambda$ is an observation wavelength, and m is a positive odd number)

In the expression, $\pm\lambda/16$ represents the error range in the production.

In the retardation film 10, an authentication region 10a where authentication information is formed, and a non-authentication region 10b other than the region 10a are formed. In the authentication region 10a, the authentication information for attaining authentication is recorded as a latent image. The authentication information cannot be observed under ordinary light, but is formed so as to come to be observable in an especial environment. The expression (1) is related to the phase difference $\Delta nd_1$ of the non-authentication region 10b. The phase difference $\Delta nd_2$ of the authentication region 10a is set to satisfy the following expression (2). The method for forming the authentication region 10a will be described below.

$$n \times \lambda/4 - \lambda/8 \leq \Delta nd_2 \leq n \times \lambda/4 + \lambda/8 \qquad (2)$$

($\lambda$ is an observation wavelength, n is 0 or a positive even number provided that n<m)

The phase difference $\Delta nd_2$ of the authentication region 10a is more preferably represented by the following expression (3):

$$\Delta nd_2 \leq \lambda/8 \qquad (3)$$

That is, this case corresponds to a case where n=0 in the expression (2).

<Observation Principle>

Figure 2:
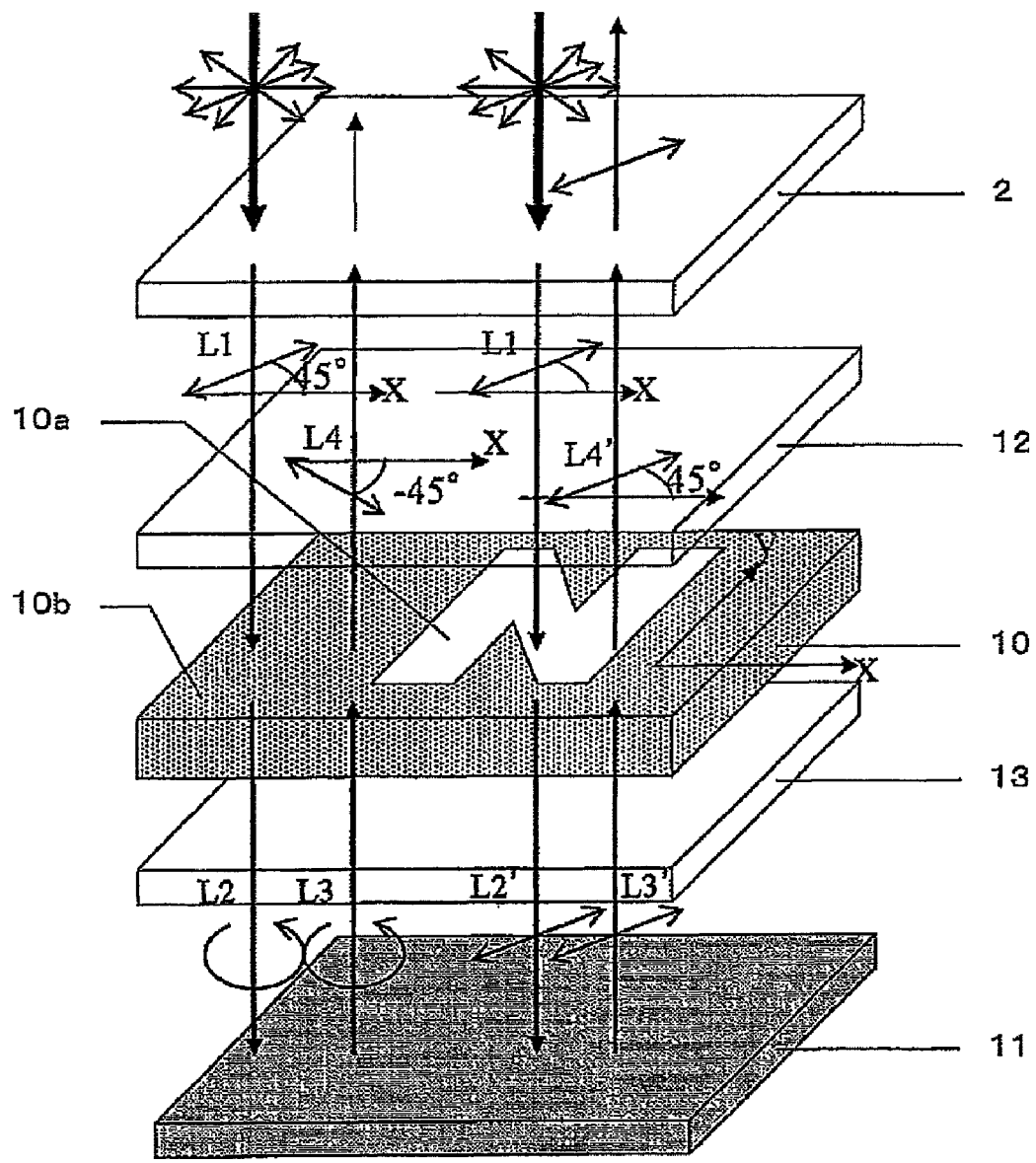
[FIG. 2] It is a view for explaining the principle for making an authentication region visible.

Next, the principle in the case that the authentication information is observed is described with reference to FIG. 2. First, linearly polarized light L1 having a predetermined polarization direction is radiated into the retardation film 10. The slow axis x and the fast axis y of the retardation film 10 are shown in FIG. 2. The light is radiated thereinto in a state that the polarization direction is inclined at a predetermined angle to the slow axis x. Most preferably, the light is radiated thereinto in a state that the polarization direction is inclined at 45° to the slow axis x. In the following description, the predetermined angle is set to 45°, and further the phase difference $\Delta nd_1$ of the non-authentication region 10b in the retardation film 10 is set to $\lambda/4$ (m=0, that is, a ¼ wavelength plate), and the phase difference $\Delta nd_2$ of the authentication region 10a is 0 (n=0).

As illustrated in FIG. 2, about the non-authentication region 10b, the linearly polarized light L1 is radiated thereinto, and transmitted through the retardation film 10, thereby converting the light to circularly polarized light L2. This circularly polarized light L2 is reflected on the metallic reflector 11, thereby converting the light to circularly polarized light L3 having a reverse polarity. When this circularly polarized light L3 is again transmitted through the retardation film 10, reflected light of linearly polarized light L4 is radiated out. The polarization direction of this reflected light is a direction perpendicular to the polarization direction of the incident light. Thus, when a polarizing plate 2 for observation is arranged so as to make its absorption axis consistent with the polarization direction of the reflected light, the reflected light cannot be transmitted through the polarizing plate 2. Accordingly, the non-authentication region 10b is observed as a black display.

Next, about the authentication region 10a, no phase difference is present; therefore, even if the same linearly polarized light L1 is radiated thereinto, the light is kept as the same linearly polarized light L2' and L3' before and after the reflection of the light on the metallic reflector 11. Thus, the polarization direction is not changed. Even after this linearly polarized light L3' is radiated out from the retardation film 10, the light L3' is linearly polarized light L4' having the same polarization direction as when the light L1 is radiated thereinto. Accordingly, the reflected light is not absorbed in the polarizing plate 2 for observation, and is transmitted through the plate 2. As illustrated in FIG. 2, therefore, a latent image "N" formed in the authentication region 10a, which is in a visible state, can be observed.

In the case that the phase difference $\Delta nd_2$ is in the range of the expression (2), the linearly polarized light L1 radiated into the authentication region 10a turns to elliptically polarized light when the light L1 is transmitted through the authentication region 10a. However, the ellipticity thereof is smaller than that of the circularly polarized light in the non-authentication region 10b. Accordingly, the degree of the reversion in the metallic reflector 11 is smaller than in the non-authentication region 10b. As a result, almost all of the light reflected thereon can be transmitted through the polarizing plate 2.

When the retardation film is produced to set the phase difference of the non-authentication region 10b in the range of the expression (1) and further to set the phase difference of the authentication region 10a in the range of the expression (2) or (3), the contrast between the authentication region 10a and the non-authentication region 10b can be sufficiently ensured. Accordingly, the authentication information can easily be read out. About the expression (1), if the error range is at a level of $\pm\lambda/16$, a very small part of the reflected light is transmitted through the polarizing plate 2. However, the level of the transmission would not be a level at which a problem is caused about the readout of the authentication information. About the expression (2), if the error range is at a level of $\pm\lambda/8$, a part of the reflected light is not transmitted through the polarizing plate 2. However, the level of the transmission would not be a level at which a problem is caused about the readout of the authentication information.

In the production of the retardation film 10, the case that the value of the phase difference $\Delta nd$ is easily controlled is a case where m=1 (that is, a case where a ¼ wavelength plate is used), and n=0. In this case, the phase difference $\Delta nd_2$ of the authentication region 10a can be represented by the expression (3).

<Specific Examples of Retardation Film>

Examples of the retardation film include a birefringence film obtained by subjecting a polymeric material to monoaxial or biaxial drawing treatment, an alignment film of a liquid crystal polymer, and a product wherein an alignment layer of a liquid crystal polymer is supported on a film. The drawing treatment can be conducted by, for example, a roll drawing method, a long-gap-following drawing method, a tenter drawing method, a tubular drawing method or the like. The draw ratio is generally from about 1.1 to about 3 in the case of the monoaxial drawing. The thickness of the retardation film is not particularly limited, and is generally from 10 to 200 µm, preferably from 20 to 100 µm.

Examples of the polymeric material include polyvinyl alcohol, polyvinyl butyral, polymethyl vinyl ether, polyhydroxyethyl acrylate, hydroxyethylcellulose, hydroxypropylcellulose, methylcellulose, polycarbonate, polyallylate, polysulfone, polyethylene terephthalate, polyethylene naphthalate, polyethersulfone, polyphenylenesulfide, polyphenyleneoxide, polyallylsulfone, polyvinyl alcohol, polyamide, polyimide, polyolefin, polyvinyl chloride, and cellulose-based polymers; and various binary copolymers or ternary copolymers thereof, graft copolymers thereof, and blend products thereof. These polymeric materials are each turned to an aligned product (drawn film) by drawing or the like.

Examples of the liquid crystal polymer include various main-chain type or side-chain type polymers wherein a conjugated, linear atomic group giving liquid crystal alignment (mesogen) is introduced into a main chain or a side chain. Specific examples of the main chain type liquid crystal polymers include polyester liquid crystal polymers having nematic alignment, discotic polymers, and cholesteric polymers, each of which has a structure wherein a mesogen group is bonded at a spacer moiety for giving bendability. Specific examples of the side chain type liquid crystal polymers include polymers wherein a main chain skeleton is made of polysiloxane, polyacrylate, polymethacrylate or polymalonate and the main skeleton has, as its side chain, a mesogen moiety made of a para-substituted cyclic compound unit capable of giving nematic alignment with a spacer moiety made of a conjugated atomic group interposed therebetween. The alignment of these liquid crystal polymers is performed, for example, by developing a solution of any one of the liquid crystal polymers onto an alignment-treated surface of a product wherein the surface of a thin film of polyimide, polyvinyl alcohol or the like that is formed on a glass plate is subjected to rubbing treatment, a product obtained by evaporating silicon oxide obliquely, or some other product, and then treating the resultant thermally.

<Formation of Authentication Region>

Next, a method for forming the authentication region 10a in the retardation film 10 is described. A typical method for producing different phase differences is a method of giving a heating pattern. When the retardation film 10 is heated at the glass transition point (Tg) or higher, the phase difference is changed to a phase difference substantially smaller than the original phase difference by thermal relaxation of the alignment. In FIG. 2, the character of "N" (corresponding to a heating pattern) is formed as the authentication information. By giving a heating pattern corresponding to this character, the authentication region 10a can be formed.

Figure 3:
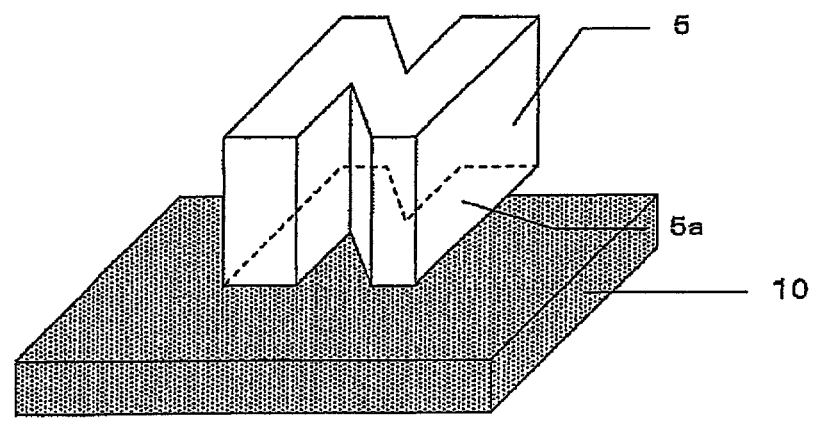
[FIG. 3] It is a view illustrating a method of forming the authentication region, using a heating stamp.
Figure 3:
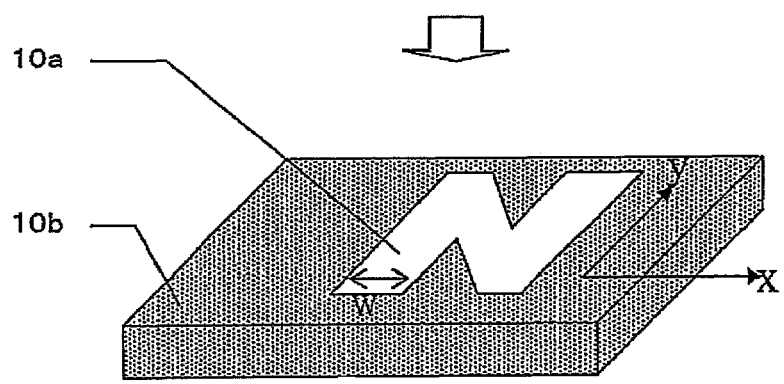

As illustrated in, for example, FIG. 3, a stamp 5 having a pattern shape 5a is heated, and the pattern shape 5a is pressed onto the retardation film 10, thereby generating thermal relaxation of the alignment. Thus, the authentication region 10a can be formed. Alternatively, the same stamp 5 is arranged closely to the retardation film 10 without being pressed thereon, whereby thermal relaxation can be generated. In an example, the thickness of the retardation film is 20 μm, a reflecting layer is made of Al 20 μm in thickness and PET 100 μm in thickness, and the temperature of the stamp 5 is set to 180° C., and the pressing time is set to 0.1 second. In this case, a good authentication region can be formed.

Figure 4:
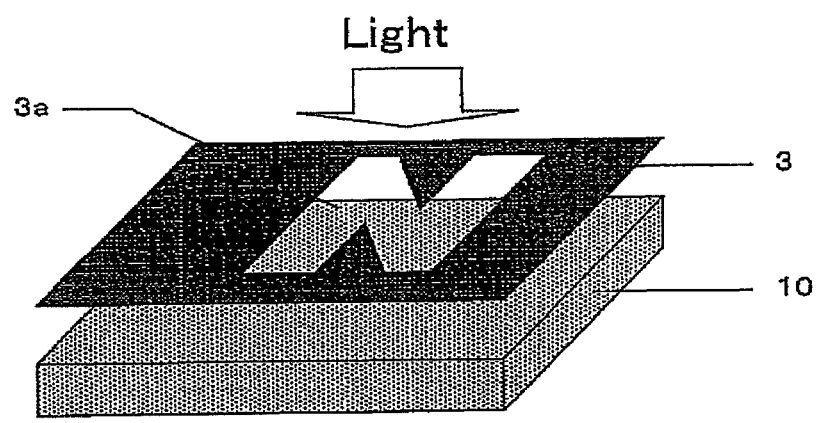
[FIG. 4] It is a view illustrating a method of forming the authentication region, using a light ray through a mask.
Figure 4:
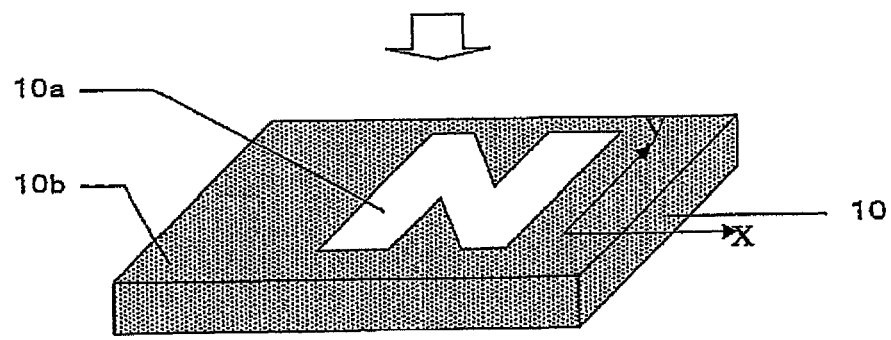
Figure 5:
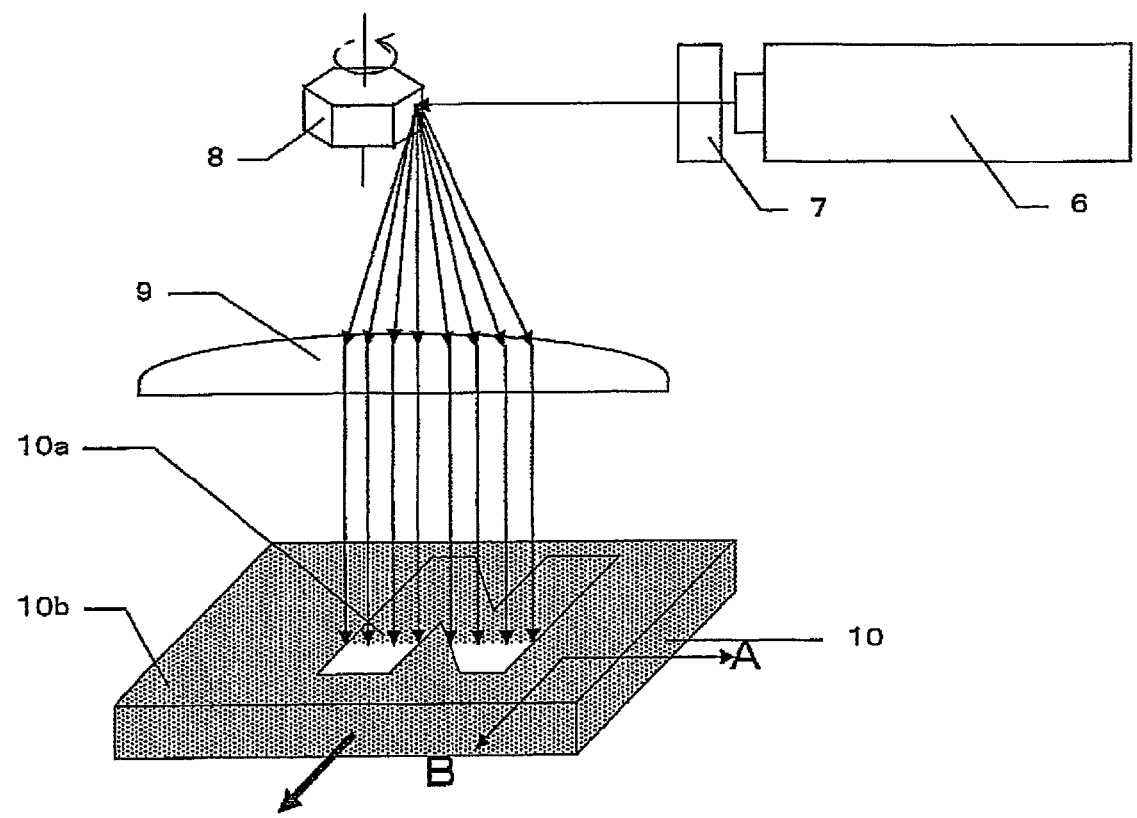
[FIG. 5] It is a view illustrating a method of forming the authentication region, using light-ray-scanning.

Instead of using the high-temperature stamp 5, thermal energy of a light ray is used to make it possible to generate thermal relaxation of the alignment. In other words, a light ray patterned in advance is radiated onto the retardation film 10, whereby thermal relaxation can be generated. As illustrated in, for example, FIG. 4, a mask 3 wherein a pattern shape 3a is formed is prepared, and light from a light source 4 is radiated thereto through the mask 3 so as to generate thermal relaxation, whereby a latent image can be formed. As illustrated in FIG. 5, a light ray is scanned onto the retardation film 10 without using the mask 3, whereby authentication information can be formed. In FIG. 5, an optical system composed of a laser ray source 6, an optical modulator 7, a polygon mirror 8, and an fθ lens 9 is used to scan a light ray, whereby authentication information can be formed. When electronized data for the authentication information are sent to the optical modulator 7, the laser ray is optically modulated so that the ray can be made intense or faint in accordance with the content of the authentication information. The laser ray is scanned only in a main scanning direction A of the retardation film 10; therefore, when the retardation film 10 itself is shifted in a secondary scanning direction B crossing the main scanning direction A at right angles, the authentication region 10a which is two-dimensional can be formed. Instead of the polygon mirror 8, a galvanomirror may be used. In this case, a pattern can be formed whether or not the film is scanned.

It is at least necessary that the light ray for exposing the retardation film 10 is absorbed in the retardation film 10 or the metallic reflector 11 so as to be converted to thermal energy. It is therefore preferred to use a light ray having a wavelength which can be absorbed in the retardation film 10 or the metallic reflector 11. For example, an infrared laser is preferred. About the manner of the laser, a carbon dioxide gas laser, a YAG laser or the like is preferred. In an example, the thickness of the retardation film is 20 μm, a reflecting layer is made of Al 20 μm in thickness and PET 100 μm in thickness, the laser is a carbon dioxide gas laser in the order of 30 W, the power is 45%, and the scan speed is set to 3000 mm/second. In this case, a good authentication region can be formed.

In order to generate thermal relaxation as described above, it is necessary to heat the retardation film 10 at the glass transition point (Tg) or higher. From the viewpoint of the thermal relaxation, the temperature is usually Tg+20° C. or higher, preferably Tg+30° C. or higher, and more preferably Tg+50° C. or higher. In such a thermal relaxation step, molecules which constitute the retardation film 10 turn into a more movable state, and a change is generated in the alignment state thereof. Thus, the molecules turn into a more random alignment state. Since the heating is heating at a temperature largely exceeding Tg, the retardation film 10 gets into a very soft state in the thermal relaxation step. In company with the change in the alignment state, the surface state also changes so that unevenness is generated.

When the heating stamp 5 as illustrated in FIG. 3 is pressed/pushed to form the authentication region 10a, the above-mentioned matter becomes particularly remarkable. The portion on which the stamp 5 is pressed is once dented by the pushing pressure and an excess of the resin is pushed out to the side face of the pattern portion of the stamp 5. Next, when the stamp 5 is separated from the retardation film 10, the resin is pulled out so that the unevenness becomes more remarkable. In the case of using a non-contact type heat source, such as a laser, also, unevenness is unfavorably generated by the stress relaxation of the retardation film 10 itself.

When such unevenness is generated, the authentication information may be read out even if observation light having a specific observation wavelength λ is not used. When the authentication information is deciphered through reflected light under ordinary light, a forgery or the like is easily made. Accordingly, even if unevenness is generated, it is necessary to take a measure for masking this. Thus, in the invention, a light diffusing layer is formed on the front face side of the retardation film 10.

<Structure of Light Diffusing Layer>

In the invention, a light diffusing layer is formed on the front face side of the retardation film 10, thereby making the unevenness substantially invisible from the outside so as to make the invisibility high. The light diffusing layer makes the unevenness, in particular, boundaries therein ambiguous by a light diffusing element used to form this layer. Moreover, the unevenness formed on the retardation film 10 is made substantially invisible by the smoothening effect of the light diffusing layer 12. It is therefore preferred that the light diffusing layer 12 is formed to adhere closely to the retardation film 10. From only the viewpoint of light diffusibility and masking performance, it is preferred to form the light diffusing layer 12 apart from the authentication region 10a. However, from the viewpoint of the resolution of the readout of the authentication information, it is preferred to cause the light diffusing layer 12 to adhere closely to the authentication region 10a rather than separating the layer 12 form the region 10a.

The light diffusing element of the light diffusing layer 12 is a fine uneven shape formed in the surface of the light diffusing layer 12 or a product in the form of grains dispersed inside the light diffusing layer 12. By the light diffusing element, the boundaries in the unevenness in the authentication region 10a can be made difficult to see by scattering.

Examples of the case that fine unevenness is formed in the surface, as the light diffusing layer 12, include a paint cured layer having surface fine unevenness wherein high refractive index transparent particles are dispersed in a low refractive index transparent resin, a paint cured layer having surface fine unevenness and made of a transparent resin wherein air bubbles are dispersed, a product wherein a substrate surface is swelled with a solvent to generate crazes, thereby producing a finely uneven surface structure, a transparent resin layer having an irregularly uneven face, and a product wherein such a layer is formed on a transparent supporting substrate, in particular, a transparent film.

The irregularly uneven face can be formed in one or more appropriate manners, such as a mechanical manner of transcribing a rough face shape of a roll, a mold or the like that is subjected to face-roughening treatment onto the surface of a substrate or a paint layer of a transparent resin formed thereon, and/or in a chemically treating manner. As the above-mentioned transparent particles, for example, one or more selected appropriately from the following can be used: inorganic particles which have an average particle diameter of 0.5 to 30 μm, are made of silica, alumina, titania, zirconia, tin oxide, indium oxide, cadmium oxide, antimony oxide or the like, and may be electroconductive; and organic particles made of a crosslinked or uncrosslinked polymer, or the like. The light diffusing layer may be formed as a monolayer product, as illustrated in FIG. 1, or a multilayer product, such as a product wherein a finely uneven surface layer 12b is formed on a transparent supporting substrate such as a transparent film.

In order to make the unevenness made in the authentication region 10a difficult to see, it is preferred to make the thickness of the light diffusing layer 12 larger than the maximum height H (see FIG. 6) of the unevenness made in the authentication region 10a of the retardation film 10. When the unevenness is made flat and smooth, the pattern becomes difficult to see under ordinary light. At this time, in order to make the existence of the unevenness per se difficult to see, it is preferred that the refractive index of the retardation film 10 and that of the light diffusing layer 12 are as close to each other as possible. This makes it possible to make the degree of the surface reflection small to make the existence of the unevenness difficult to see by observation through reflected light of ordinary light. The difference between the two refractive indexes is set preferably to 0.1 or less, more preferably to 0.05 or less, and even more preferably to 0.03 or less.

The size of the light diffusing element of the light diffusing layer 12 is preferably made smaller than the size of the heating pattern. The size of the heating pattern is represented by W in FIG. 3. When the pattern is a character, the size is the line width of the character. When the pattern is a bar code, the size is the width of the bar. If the light diffusing element is larger than the size of the heating pattern, it is difficult to exhibit the masking effect. The size of the light diffusing element is more preferably made smaller than the size of the heating pattern by ¼ or less. When the size is set in this range, the masking effect can be further exhibited.

The formation process (production process) of the light diffusing layer 12 is not limited to any specific method. Examples thereof include a method of applying a mixture wherein transparent fine particles are dispersed in a transparent resin onto the surface of the retardation film 10 wherein a heating pattern is beforehand formed, and then curing the mixture, and a method of applying a transparent resin onto the retardation film 10 wherein a heating pattern is beforehand formed, pushing a mold wherein unevenness for the light diffusing layer is beforehand formed onto the painted resin, curing the resultant, and then peeling off the mold. Until this light diffusing layer 12 is formed, the heating pattern (the authentication information) is not observable by use of a polarizing plate.

The material of the light diffusing layer 12 is not particularly limited. For example, an ultraviolet curing resin, a thermosetting resin or the like is used. However, if the shrinkage of the resin is large in the step of drying or curing the resin, the shape of the underlying retardation film 10 is reflected thereon so that the effect based on the formation of the light diffusing layer 12 unfavorably becomes small. Thus, as the amount of the resin is larger so far as circumstances permit, the shrinkage is favorably smaller. More preferably, no solvent is used. As the hardening shrinkage is smaller, a more preferred result is produced. The hardening shrinkage is 10% or less, preferably 8% or less, and more preferably 5% or less.

The material of the retardation film 10 has been described as above. Preferable is a thermoplastic resin wherein a given phase difference is generated when the resin is drawn. If the glass transition point (Tg) is too low, the stability of the heating pattern unfavorably becomes low. If the Tg is too high, the heating relaxability unfavorably becomes low. The Tg preferably ranges from 90 to 180° C. (inclusive). Examples thereof include polycarbonate resin, norbornene resin, acrylic resin, and polyolefin resin. Accordingly, any thermosetting resin, thermal crosslinking resin or UV curable resin is not preferred. A material which is not colored at the heating temperature is preferable.

As the means for causing the retardation film 10 and the metallic reflector 11 to adhere onto each other, a sticking agent or adhesive agent is used. The material thereof is not particularly limited. It is sufficient that the material is transparent to an observation wavelength λ. As the heat resistance is higher, a better result is obtained. The material may be any material as long as the material does not cause peeling, deformation or discoloration between the retardation film 10 and the metallic reflector 11 when they are exposed to the heating pattern.

A preferred example of the sticking agent is an agent, which has a very good optical transparency and exhibits such sticking properties that appropriate wettability, cohesive property, and adhesiveness are exhibited. A specific example thereof is a sticking agent prepared appropriately using, as a base polymer, acrylic polymer, silicone polymer, polyester, polyurethane, polyamide, polyether, fluorine-contained polymer, rubbery polymer, or the like.

The light diffusing layer 12 and the retardation film 10 are each preferably made of a transparent material. This means that the layer or film should be transparent to an observation wavelength λ for reading out the authentication information. Accordingly, the material may optically absorb any wavelength other than the observation wavelength λ. By use of a wavelength other than the observation wavelength λ, an appropriate shape or pattern may be printed onto the surface of the light diffusing layer 12. Such surface printing is preferred in order to make the authentication information invisible.

<Metallic Reflector>

Figure 6:
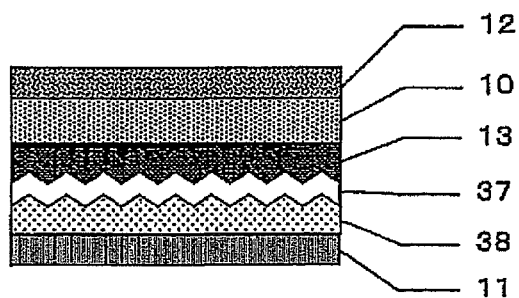
[FIG. 6] It is a view illustrating a structural example in the case of using a phase hologram as a reflecting layer.

The material of the metallic reflector 11 is not particularly limited. Preferred examples thereof include metal foil made of aluminum, stainless steel, copper, chromium or the like. In order to form the authentication region 10a satisfactorily, it is more preferred that the thickness of the metal foil is larger. It is more preferred that the thermal diffusibility and the thermal capacity thereof are larger since the region where the retardation film 10 is thermally relaxed is restricted into a given scope at the time of exposing the metallic reflector to the heating pattern. In particular, when a resin substrate (a PET film or the like) is formed as a lining on the rear face of the metallic reflector 11 (the metal foil), the shrinkage thereof favorably becomes small. Moreover, the rigidity becomes high by action of the resin substrate, so that the effect of shrinkage deformation following the thermal relaxation of the retardation film 10 favorably becomes small. The metal foil is heavy and is easily bent, and such a drawback can be compensated by lining the resin substrate. In particular, in the case of a metal small in strength such as aluminum, it is effective to line the resin substrate. In the case of stainless steel, a resin substrate is not necessarily required. It is also preferred that the surface shape of the metallic reflector 11 is a diffusing surface rather than a mirror face. Such a case can be made the pattern shape more unclear. As illustrated in FIG. 6, instead of the metallic reflector, a phase hologram wherein its reflecting layer is made of a finely uneven diffraction grating can be used. The reflecting layer 37 is vapor-deposited on a hologram formed layer 38. In this case, the picture of the hologram is seen in an ordinary state.

<Use Example>

Next, a use example of the multilayer reflector according to the invention is described. The content of the authentication information formed in the authentication region 10a is not particularly limited, and may be made of any character, number, symbol or figure, or any combination thereof. As well as a normal image of a predetermined pattern for authentication, a reversal image thereof may be formed. The authentication information may be used as a one-dimensional bar code or two-dimensional bar code.

Examples of an article wherein the multilayer reflector is used include a prepaid card, a credit card, an ID card, a bar code label, an authentication label, a passport, a driver's license, various licenses (cards) and other authentication cards. These are each stuck onto an object the genuineness of which should be certified by use of an adhesive (such as a sticking agent), and the resultant can be used. According to the sectional structure in FIG. 1, a structure wherein a sticking agent layer is beforehand formed is shown.

<Production Process of Multilayer Reflector>

Figure 7:
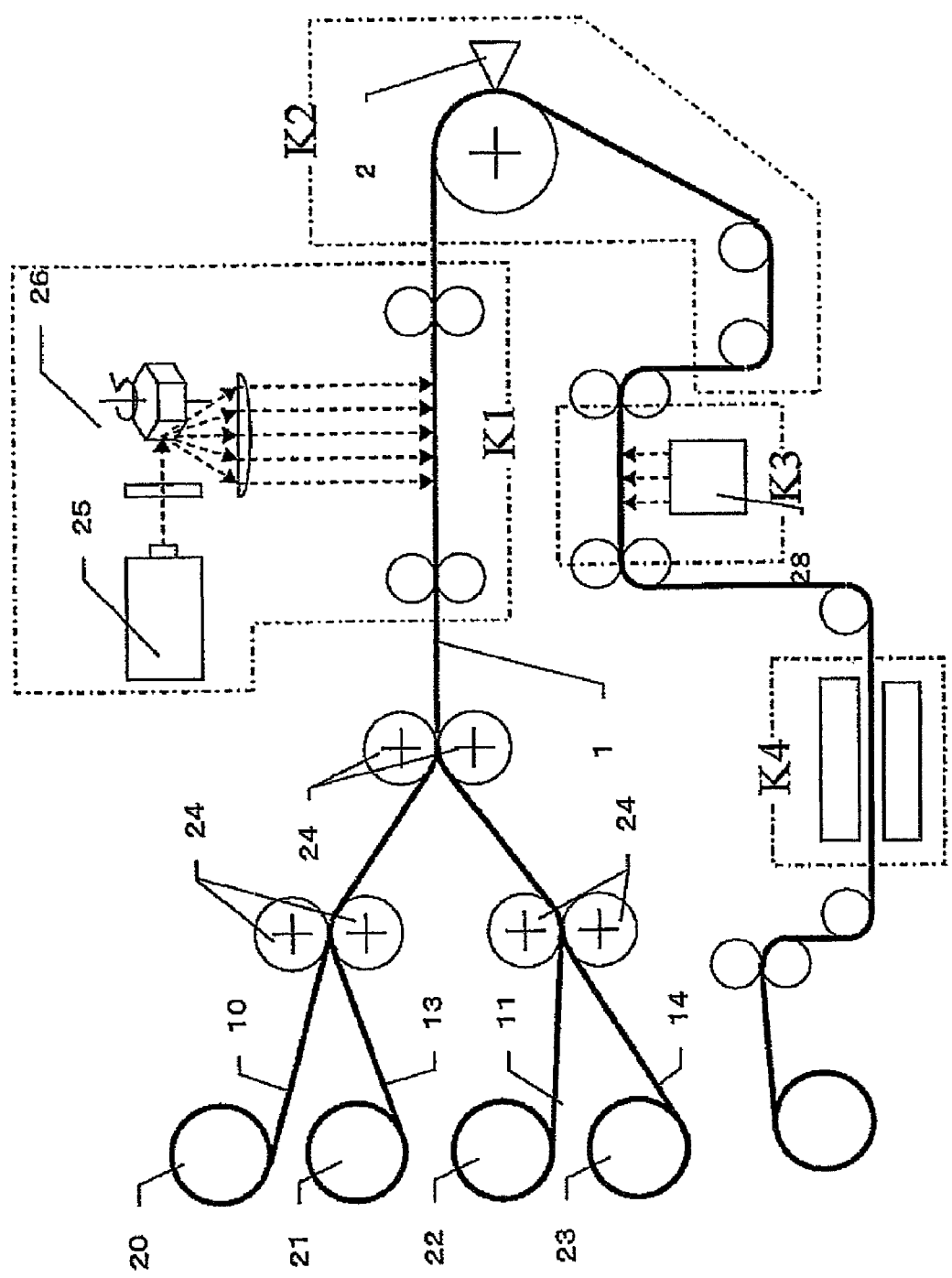
[FIG. 7] It is a view illustrating a process of producing a multilayer reflector.

Next, a production process of the multilayer reflector 1 illustrated in FIG. 1 is described with reference to FIG. 7. The production process is constructed so as to be roughly divided into 4 steps K1 to K4. In order to produce the multilayer reflector 1, the following are beforehand prepared: a roll 20 of the retardation film 10 (the ¼ wavelength plate), a sticking agent roll 21 for forming the first sticking agent layer 13, a metal foil roll 22 for laminating the metallic reflector 11, and a sticking agent roll 23 for forming the second sticking agent layer 14. The sheet-form materials pulled out from these individual rolls are caused to adhere to each other by a laminating roller 24, and laminated onto each other.

In the first step K1, authentication information is formed as a latent image. In the illustrated example, an example wherein a latent image is formed by radiation of a laser ray is illustrated. Specifically, a laser light source 25 (corresponding to the heating means) and a light scanning means 26 are used to form a latent image of authentication information by exposure to light. In the second step K2, the step of painting a surface layer for forming the light diffusing layer 12 is performed. A painting device 27 is used to paint a mixture of fine particles and a transparent resin onto the surface of the retardation film 10. In the third step K3, a UV radiating device 28 is used to crosslink and cure the painted light diffusing layer. In the fourth step K4, a labeler processing is performed.

<Structure of Authentication System>

Figure 8:
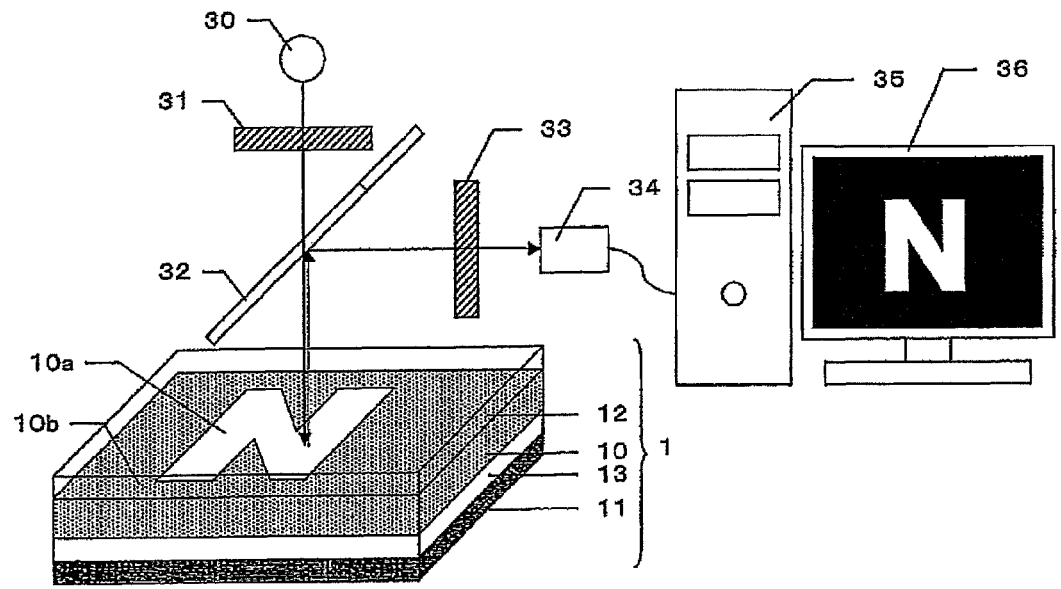
[FIG. 8] It is a view illustrating a structural example of an authentication system.

Next, an authentication system of using the multilayer reflector 1 according to the invention to make authentication is described with reference to a schematic view of FIG. 8. A light source 30 for readout, a polarizing plate 31, and a half mirror 32 are arranged along an optical axis, and a light ray radiated from the light source 30 is converted, through the polarizing plate 31, to linearly polarized light having a specific polarization direction. The light is passed, as it is, through the half mirror 32 so as to go into the multilayer reflector 1. The absorption axis of the polarizing plate 31 is arranged to give a predetermined angle (preferably, 45°) to the slow axis of the retardation film 10.

The reflected light resulting from reflection on the metallic reflector 11 of the multilayer reflector 1 is reflected at 90° on the half mirror 32, and is then radiated into a polarizing plate 33 for observation. The absorption axis of this polarizing plate 33 is arranged to give a predetermined angle (preferably, 45°) to the slow axis of the retardation film 10. A light receiving unit 34 is arranged adjacently to the polarizing plate 33, and is made of, for example, a two-dimensional CCD sensor. A reading device 35 processes signals received optically by the light receiving unit 34, and causes a display unit 36 to display the read authentication information in the display unit 36. In the display unit 36, for example, a liquid crystal monitor is used.

The absorption axes of the polarizing plates 31 and 33 and the slow axis of the retardation film 10 are set to different angles. However, an angle of 45° is ideally made, as described above. Preferably, an angle of 45°±5° is made. When the angle is in this range, the transmittance of the black display section of the non-authentication region 10b ideally becomes 3%, whereby a contrast can be certainly kept.

The kind of the light source 30 is not particularly limited, and the following can be used: a light source having plural emission wavelengths, such as an incandescent lamp, a cold cathode tube, a hot cathode tube, a halogen lamp or a xenon lamp; or a monochromic light source, such as a sodium lamp, or a laser. In the case of the light source having plural emission wavelengths, a combination thereof with a color filter can be used to convert the light to monochromic light. About the emission wavelength, light having arbitrary wavelengths, such as visible rays, ultraviolet rays, or infrared rays, can be used. However, light having a wavelength absorbable in the retardation film 10, the light diffusing layer 12 or the sticking agent is not preferred since the signals are attenuated. The wavelength of the light source 30 can be selected to make wavelength-detecting-characteristics of the light receiving unit 34 most appropriate.

About the polarizing plate 31, through a circularly polarizing plate wherein a linearly polarizing plate is combined with a ¼ wavelength plate, circularly polarized light may be radiated into the multilayer reflector 1. When the light source 30 gives vibration of linearly polarized light as a laser gives, the polarizing plate 31 arranged before the light source 30 may not be necessarily used.

Figure 9:
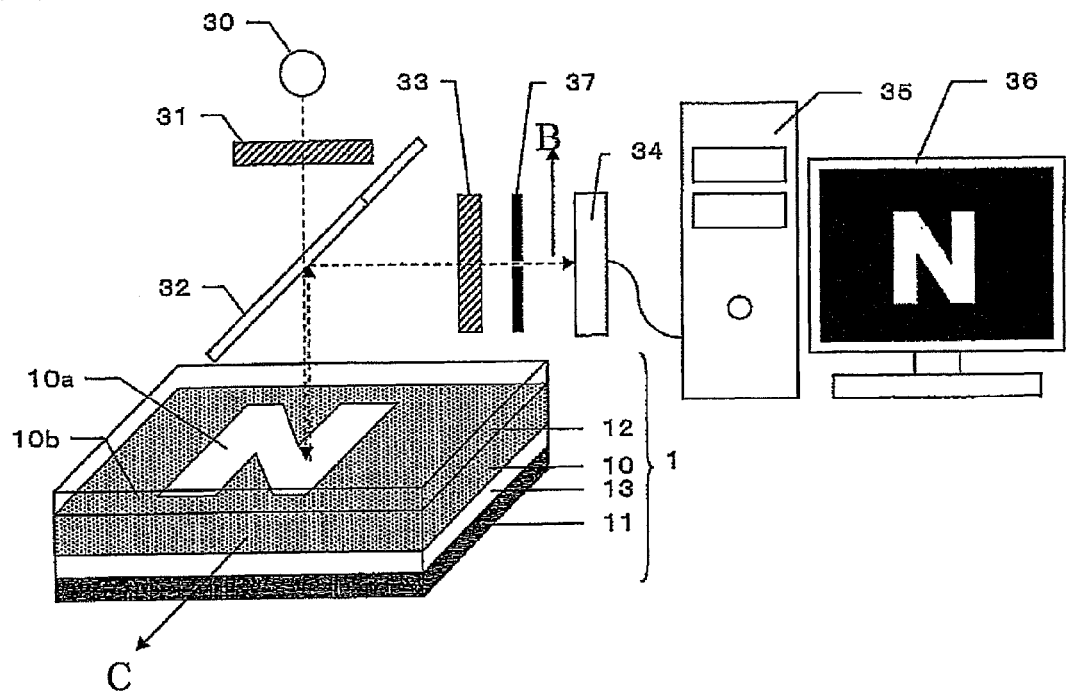
[FIG. 9] It is a view illustrating another structural example of the authentication system.

FIG. 9 is a view illustrating another embodiment of the authentication system. Only points different from the embodiment in FIG. 8 are described. In this embodiment, a slit 37 is arranged between the polarizing plate 33 and the light receiving unit 34. The light receiving unit 34 is made of, for example, a one-dimensional CCD line sensor. When the slit-formed direction of the slit 37 and the arrangement direction of the line sensor in the light receiving unit 34 are each B direction, the authentication information can be scanned by shifting the multilayer reflector 1 in the direction of an arrow C in FIG. 9. Also, by use of pinholes instead of the slit 37, the scanning system can be constructed. <Another Embodiment>

The authentication information related to the invention is not limited to information in any specific form. The authentication information can be constructed by, for example, a character, a number or a symbol, or any combination thereof. The authentication information may be constructed by an appropriate shape, figure, pattern or design, or any combination thereof, or by a combination of any one of these elements with a character, a number or the like.

The object wherein the multilayer reflector is used is not limited to any specific article. For example, the multilayer reflector can be attached to an authentication card or can be used as a bar code label. The multilayer reflector can be applied, as an authentication card, to a credit card, prepaid card, ID card, driver's license, staff member's card, passport, any member's card, or the like. The multilayer reflector can be used as a one-dimensional or two-dimensional bar code label. Such a bar code label can be attached to any article (commercially available product).

The invention claimed is:

1. A multilayer reflector, comprising:
   a retardation film in which the phase difference $\Delta nd_1$ to an observation wavelength $\lambda$ is set to be $m \times \lambda/4$ wherein m is a positive odd number, and
   a reflecting means laminated on the rear face side of this retardation film,
   wherein an authentication region where predetermined authentication information is beforehand formed in the retardation film is formed to give a phase difference $\Delta nd_2$ different from the phase difference $\Delta nd_1$, and further
   a light diffusing layer is formed on the front face side of the retardation film.

2. The multilayer reflector according to claim 1, wherein the phase difference $\Delta nd_1$ of the retardation film is produced with an error range of $\pm\lambda/16$.

3. The multilayer reflector according to claim 1, wherein the phase difference $\Delta nd_2$ of the authentication region is set to be $n \times \lambda/4$ wherein n is 0 or a positive even number provided that n<m.

4. The multilayer reflector according to claim 3, wherein the phase difference $\Delta nd_2$ of the authentication region is produced with an error range of $\pm\lambda/8$.

5. The multilayer reflector according to claim 1, wherein the phase difference $\Delta nd_2$ of the authentication region is $\lambda/8$ or less.

6. The multilayer reflector according to claim 1, wherein the authentication region is formed by pressing a stamp having a heating pattern corresponding to the authentication information onto the retardation film, or arranging the stamp closely to the retardation film, thereby relaxing the alignment of the retardation film thermally.

7. The multilayer reflector according to claim 6, wherein the heating temperature for the authentication region is a temperature not lower than the glass transition point of the retardation film.

8. The multilayer reflector according to claim 1, wherein the authentication region is formed by radiating a light ray patterned correspondingly to the authentication information to the retardation film, or scanning a light ray onto the retardation film, thereby forming a predetermined pattern to relax the alignment of the retardation film thermally.

9. The multilayer reflector according to claim 1, wherein the authentication information is made of a one-dimensional or two-dimensional bar code.

10. The multilayer reflector according to claim 1, wherein the size of a light diffusing element of the light diffusing layer is smaller than the size of a pattern formed in the authentication region.

11. The multilayer reflector according to claim 10, wherein the light diffusing element is at least one of an uneven shape of the surface of the light diffusing layer and an object in the form of grains dispersed in the light diffusing layer, and the size thereof is smaller than the size of the pattern by ¼ or less.

12. The multilayer reflector according to claim 1, wherein the light diffusing layer is formed to adhere closely onto the front face side of the retardation film.

13. The multilayer reflector according to claim 1, wherein the light diffusing layer is made of a mixture of a transparent resin and transparent fine particles dispersed therein.

14. The multilayer reflector according to claim 1, wherein the reflecting means is constituted by a phase hologram made of a diffraction grating.

15. An authentication card having the multilayer reflector according to claim 1.

16. A bar code label having the multilayer reflector according to claim 1.

17. An authentication system, comprising:
    a light source for radiating light onto the multilayer reflector according to claim 1,
    a light receiving unit for reading out reflected light from the multilayer reflector, and
    a linearly polarizing plate arranged between the multilayer reflector and the light receiving unit, wherein the absorption axis of this linearly polarizing plate is set to give an angle different from that of the optical axis of the retardation film constituting the multilayer reflector.

18. The authentication system according to claim 17, wherein the angle is about 45°.

19. The authentication system according to claim 17, comprising a pinhole or slit arranged between the light receiving unit and the multilayer reflector, and
    a scanning means for scanning the authentication information formed in the multilayer reflector through this pinhole or slit,
    the system being made to receive optically the authentication information scanned by the light receiving unit.

20. An authentication region forming system, having a heating means capable of attaining heating to a temperature not lower than the temperature at which the phase difference can be changed in order to form the authentication region in the multilayer reflector according to claim 1.

* * * * *